United States Patent
Miller et al.

(10) Patent No.: US 9,944,276 B2
(45) Date of Patent: Apr. 17, 2018

(54) METHOD AND SYSTEM FOR ENGINE CONTROL

(71) Applicant: Ford Global Technologies, LLC, Dearborn, MI (US)

(72) Inventors: Kenneth James Miller, Canton, MI (US); Thomas G. Leone, Ypsilanti, MI (US); Douglas Raymond Martin, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/146,687

(22) Filed: May 4, 2016

(65) Prior Publication Data

US 2017/0320485 A1  Nov. 9, 2017

(51) Int. Cl.
*B60W 20/40* (2016.01)
*B60W 20/17* (2016.01)
(Continued)

(52) U.S. Cl.
CPC ............... *B60W 20/40* (2013.01); *B60K 6/24* (2013.01); *B60K 6/26* (2013.01); *B60K 6/365* (2013.01); *B60K 6/48* (2013.01); *B60W 10/06* (2013.01); *B60W 10/08* (2013.01); *B60W 20/17* (2016.01); *F02D 15/04* (2013.01); *B60W 2540/00* (2013.01); *B60W 2710/0666* (2013.01);
(Continued)

(58) Field of Classification Search
CPC ...... B60W 20/40; B60W 20/17; B60W 10/06; B60W 10/08; B60K 6/24; B60K 6/26; B60K 6/365; B60K 6/48; F02D 15/04
USPC ........................................................... 701/22
See application file for complete search history.

(56) References Cited

U.S. PATENT DOCUMENTS 3,254,620 A  6/1966 Cannon
3,640,894 A  2/1972 Sampson et al.
(Continued)

FOREIGN PATENT DOCUMENTS

CA  2762747 A1  7/2012
CN  1223335 A  7/1999
(Continued)

OTHER PUBLICATIONS

Hoffmann, W., et al., "A New Approach to Ethanol Utilization: High Efficiency and Low NOx in an Engine Operating on Simulated Reformed Ethanol," SAE Technical Paper 2008-01-2415, Powertrains, Fuels & Lubricants Meeting, Rosemont, IL, Oct. 6-9, 2008, 11 pages.
(Continued)

*Primary Examiner* — Yazan A Soofi
(74) *Attorney, Agent, or Firm* — David Kelley; McCoy Russell LLP

(57) ABSTRACT

Methods and systems are provided for synergizing the benefits of a variable compression ratio engine in a hybrid vehicle system. A vehicle controller may hold the engine in a lower compression ratio during engine pull-ups and pull-downs, in particular when passing through a low speed region where compression bobbles can occur. During engine operation, in response to a change in driver demand, the controller may opt to switch the compression ratio or maintain a current compression ratio while smoothing a torque deficit using motor torque, the selection based on fuel economy.

20 Claims, 6 Drawing Sheets

(51) Int. Cl.
*B60W 10/06* (2006.01)
*B60W 10/08* (2006.01)
*B60K 6/24* (2007.10)
*B60K 6/26* (2007.10)
*B60K 6/365* (2007.10)
*B60K 6/48* (2007.10)
*F02D 15/04* (2006.01)

(52) U.S. Cl.
CPC .... *B60W 2710/083* (2013.01); *B60Y 2200/92* (2013.01); *B60Y 2300/43* (2013.01); *B60Y 2306/09* (2013.01); *F02D 2200/60* (2013.01); *F02D 2250/21* (2013.01); *Y10S 903/905* (2013.01); *Y10S 903/906* (2013.01); *Y10S 903/91* (2013.01); *Y10S 903/93* (2013.01)

(56) References Cited

U.S. PATENT DOCUMENTS

| | | |
|---|---|---|
| 4,391,716 A | 7/1983 | McCurry |
| 4,505,169 A | 3/1985 | Ganoung |
| 5,237,978 A | 8/1993 | Bailey |
| 5,408,874 A | 4/1995 | Fleck, Sr. et al. |
| 5,785,136 A | 7/1998 | Falkenmayer et al. |
| 5,806,617 A | 9/1998 | Yamaguchi |
| 6,116,363 A | 9/2000 | Frank |
| 6,276,473 B1 | 8/2001 | Zur Megede |
| 6,378,637 B1 | 4/2002 | Ono et al. |
| 6,450,193 B1 | 9/2002 | Constantinou |
| 6,655,324 B2 | 12/2003 | Cohn et al. |
| 6,715,452 B1 | 4/2004 | Taylor, III et al. |
| 6,715,453 B2 | 4/2004 | Tomatsuri et al. |
| 6,796,287 B2 | 9/2004 | Mogi et al. |
| 6,915,766 B2 | 7/2005 | Aoyama et al. |
| 6,929,582 B2 | 8/2005 | Yang et al. |
| 6,970,781 B1 | 11/2005 | Chen et al. |
| 7,213,397 B2 | 5/2007 | Hu et al. |
| 7,258,099 B2 | 8/2007 | Yoshida et al. |
| 7,267,087 B2 | 9/2007 | Glugla |
| 7,295,902 B2 | 11/2007 | Chen et al. |
| 7,426,907 B2 | 9/2008 | Dearth et al. |
| 7,703,435 B2 | 4/2010 | Surnilla et al. |
| 7,676,321 B2 | 5/2010 | Andri |
| 7,748,481 B2 | 7/2010 | Holmes et al. |
| 7,805,238 B2 | 9/2010 | Andri |
| 7,826,957 B2 | 11/2010 | Fabien |
| 7,832,511 B2 | 11/2010 | Syed et al. |
| 7,845,315 B2 | 12/2010 | Leone et al. |
| 7,925,418 B2 | 4/2011 | Fabien |
| 8,015,951 B2 | 9/2011 | Dearth et al. |
| 8,050,831 B2 | 11/2011 | Martin et al. |
| 8,065,979 B2 | 11/2011 | Leone et al. |
| 8,118,009 B2 | 2/2012 | Pursifull et al. |
| 8,127,745 B2 | 3/2012 | Surnilla et al. |
| 8,141,356 B2 | 3/2012 | Leone et al. |
| 8,312,867 B2 | 11/2012 | Pursifull et al. |
| 8,375,899 B2 | 2/2013 | Leone et al. |
| 8,387,591 B2 | 3/2013 | Surnilla et al. |
| 8,539,914 B2 | 9/2013 | Kerns et al. |
| 8,550,058 B2 | 10/2013 | Pursifull et al. |
| 8,606,474 B2 | 12/2013 | Guo et al. |
| 8,656,869 B2 | 2/2014 | Leone et al. |
| 8,701,630 B2 | 4/2014 | Surnilla et al. |
| 8,738,255 B2 | 5/2014 | Carter et al. |
| 8,746,189 B2 | 6/2014 | Kawasaki |
| 9,038,613 B2 | 5/2015 | Pursifull et al. |
| 9,157,385 B2 | 10/2015 | Gallagher et al. |
| 9,376,967 B2 | 6/2016 | Springer et al. |
| 2004/0153234 A1* | 8/2004 | Mogi ............... B60K 6/445 701/103 |
| 2004/0188154 A1 | 9/2004 | Carlson |
| 2010/0063658 A1 | 3/2010 | Martin et al. |
| 2011/0029177 A1 | 2/2011 | Yeung et al. |
| 2011/0246010 A1 | 10/2011 | de la Torre Bueno |
| 2013/0055990 A1 | 3/2013 | Kamada |
| 2013/0116867 A1* | 5/2013 | Thompson ........... B60W 20/00 701/22 |
| 2014/0067540 A1 | 3/2014 | Williams et al. |
| 2014/0116395 A1 | 5/2014 | Blackstock |
| 2014/0202430 A1 | 7/2014 | Monros |
| 2014/0222275 A1* | 8/2014 | Ohsumi ................. B60K 6/24 701/22 |
| 2015/0114359 A1 | 4/2015 | Leone et al. |
| 2015/0285161 A1* | 10/2015 | Ulrey ................... F02D 21/04 477/3 |
| 2015/0300830 A1 | 10/2015 | Fisher |

FOREIGN PATENT DOCUMENTS

| | | |
|---|---|---|
| CN | 103291468 A | 9/2013 |
| CN | 104005861 A | 8/2014 |
| CN | 203756344 U | 8/2014 |
| JP | 407019124 A | 1/1995 |
| JP | 2006257907 A | 9/2006 |
| JP | 2007077918 A | 3/2007 |
| SU | 0731020 | 4/1980 |
| SU | 0848725 | 7/1981 |
| WO | 2007027327 A2 | 3/2007 |

OTHER PUBLICATIONS

Kadota, M. et al., "Advanced Control System of Variable Compression Ratio (VCR) Engine with Dual Piston Mechanism," SAE International 2009-01-1063, Apr. 20, 2009, 10 pages.

Wheeler, Jennifer C. et al., "High Efficiency, Low Feedgas NOx, and Improved Cold Start Enabled by Low Temperature Ethanol Reforming," SAE International 2010-01-0621, Apr. 12, 2010, 18 pages.

Wheeler, Jennifer C. et al., "Low-Temperature Ethanol Reforming: A Multi-Cylinder Engine Demonstration," SAE International 2011-01-0142, Apr. 12, 2011, 20 pages.

Kleeberg, Henning et al., "Increasing Efficiency in Gasoline Powertrains with a Two-Stage Variable Compression Ratio (VCR) System," SAE International 2013-01-0288, Apr. 8, 2013, 10 pages.

Morgenstern, David et al., "Integration of an E85 Reforming System into a Vehicle-Ready Package and Project Results," SAE International 2014-01-1191, Apr. 1, 2014, 12 pages.

Ferrey, Paul et al., "Potential of a Variable Compression Ratio Gasoline SI Engine with Very High Expansion Ratio and Variable Valve Actuation," SAE International 2014-01-1201, Apr. 1, 2014, 20 pages.

Glugla, Chris Paul, "Method and System for Pre-Ignition Control," U.S. Appl. No. 14/604,279, filed Jan. 23, 2015, 54 pages.

Glugla, Chris Paul, "Method and System for Engine Control," U.S. Appl. No. 14/923,900, filed Oct. 27, 2015, 41 pages.

Leone, Thomas G. et al., "Method and System for Engine Control," U.S. Appl. No. 15/146,720, filed May 4, 2016, 62 pages.

Leone, Thomas G. et al., "Method and System for Hybrid Vehicle Control," U.S. Appl. No. 15/146,752, filed May 4, 2016, 46 pages.

Miller, Kenneth James et al., "Method and System for Engine Control," U.S. Appl. No. 15/146,784, filed May 4, 2016, 47 pages.

Miller, Kenneth James et al., "Method and System for Engine Control," U.S. Appl. No. 15/146,809, filed May 4, 2016, 52 pages.

Miller, Kenneth James et al., "Method and System for Engine Control," U.S. Appl. No. 15/146,822, filed May 4, 2016, 47 pages.

* cited by examiner

METHOD AND SYSTEM FOR ENGINE CONTROL

FIELD

The present description relates generally to methods and systems for controlling an engine compression ratio in a hybrid vehicle system.

BACKGROUND/SUMMARY

The compression ratio of an internal combustion engine is defined as the ratio of the cylinder volume when the piston is at bottom-dead-center (BDC) to the cylinder volume when the piston is at top-dead-center (TDC). In general, the higher the compression ratio, the higher the thermal efficiency of the internal combustion engine. This in turn results in improved fuel economy and a higher ratio of output energy versus input energy of the engine. In conventional engines, the compression ratio is fixed and thus the engine efficiency cannot be optimized during operating conditions to improve fuel economy and engine power performance.

Various technologies have been developed to enable the compression ratio of an engine to be varied with engine operating conditions. One example approach is shown by Yoshida et al. in U.S. Pat. No. 7,258,099. Therein, cam timing adjustments are used to vary the effective compression ratio. For example, a late intake valve closing is used to reduce the effective compression ratio. Still other approaches, such as shown by Kamada et al. in US20130055990, rely on a piston displacement changing mechanism that moves the pistons closer to or further from the cylinder head, thereby changing the size of the combustion chambers.

However the inventors herein have recognized potential issues with such approaches. As one example, there may be constraints and trade-offs associated with the cam timing adjustments of Yoshida, such as reduced volumetric efficiency, torque, and power when low compression ratio is desired. Another issue is that frequent changes in operator pedal demand may cause the engine load to move back and forth, leading to frequent switching between the compression ratios. Excessive compression ratio switches can degrade fuel economy due to losses incurred during transitions. The issue may be exacerbated in a hybrid vehicle where the engine encounters multiple engine pull-ups and pull-downs (such as during frequent start/stop events). The fuel losses during pull-ups and pull-downs may be proportional to pumping and friction work of the engine. Yet another issue associated with the frequent engine pull-ups and pull-downs is that a bobble can occur as the engine passes through the low speed range (e.g., between 300-500 rpm). This rapid and repeated temporary speed fluctuation (relative to an average speed change passing through the window) is due to torque pulsations from engine compression-expansion cycles that excite the vehicle in that speed range, especially in the common hybrid powertrain designs, such as the power-split, that have a direct mechanical connection between the engine and the wheels.

The inventors herein have recognized that a variable compression ratio (VCR) engine, such as one configured with a mechanism that mechanically alters a piston position with a combustion chamber, can be leveraged in a hybrid vehicle system to reduce the compression ratio during engine pull-up and pull-down events without being hindered by associated constraints and trade-offs. At the same time, battery power can be leveraged to reduce the frequency of compression ratio switching. In one example, fuel economy may be improved by a method for a hybrid vehicle system comprising shifting between propelling the vehicle via motor torque and engine torque responsive to driver demand; and during the shifting, when engine speed is at or below a threshold speed, transitioning the engine to a lower compression ratio via mechanical adjustments. In addition, the controller may select between maintaining a given compression ratio or transitioning to the other compression ratio based at least on a system battery state of charge. As a result, frequent compression ratio switching can be reduced.

As an example, a hybrid vehicle system may be configured with a battery powered electric motor for propelling vehicle wheels via motor torque, as well as a VCR engine for propelling vehicle wheels via engine torque. The VCR engine may include a VCR mechanism for mechanically altering a compression ratio of the engine, such as by altering a position of a piston within a cylinder, or altering a cylinder head volume, as non-limiting examples. During conditions when the engine is being pulled-up (such as during a transition from electric mode to engine mode), as well as when the engine is being pulled down (such as during a transition from engine mode to electric mode), the engine may be operated with a lower compression ratio. In particular, the lower compression ratio setting may be selected and held during the engine pull-up until the engine speed exceeds the bobble region (e.g., between 300-500 rpm). Likewise, during the engine pull-down, the engine may be transitioned to the lower compression ratio setting just before the engine enters the bobble region. Once outside the bobble region, a vehicle controller may select a compression ratio that provides the highest fuel economy for a given torque demand. This may include, for example, in response to a change in torque demand, providing engine torque while maintaining a current compression ratio setting and while additionally applying an amount of motor torque to meet the driver torque demand.

In this way, fuel economy losses in a vehicle system can be reduced. One of the technical effects of using VCR technology in a hybrid vehicle is that the compression ratio can be reduced during the frequent engine pull-ups and pull-downs with fewer constraints and trade-offs. The lower compression ratio during the start/stop event results in lower cylinder pressure, which decreases pumping work (the work to compress and expand the cylinder air), piston ring friction and piston side loads, thereby improving fuel economy. In addition, heat transfer losses and blow-by during engine pull-up/pull-down is reduced, lowering the negative in-cylinder mean effective pressure (IMEP) in the compression/expansion loop. This enables friction and pumping losses to be reduced, and improves noise, vibration, and harshness (NVH). Furthermore, by applying the lower compression ratio in the lower engine speed region, torque pulsations (such as those incurred when the engine passes through the bobble region) are reduced. The technical effect of using battery power to meet driver demand while maintaining an engine compression ratio during selected engine operating conditions is that compression ratio switching can be reduced. In addition, engine operation in a more fuel efficient compression ratio can be extended despite changes in driver or wheel torque demand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
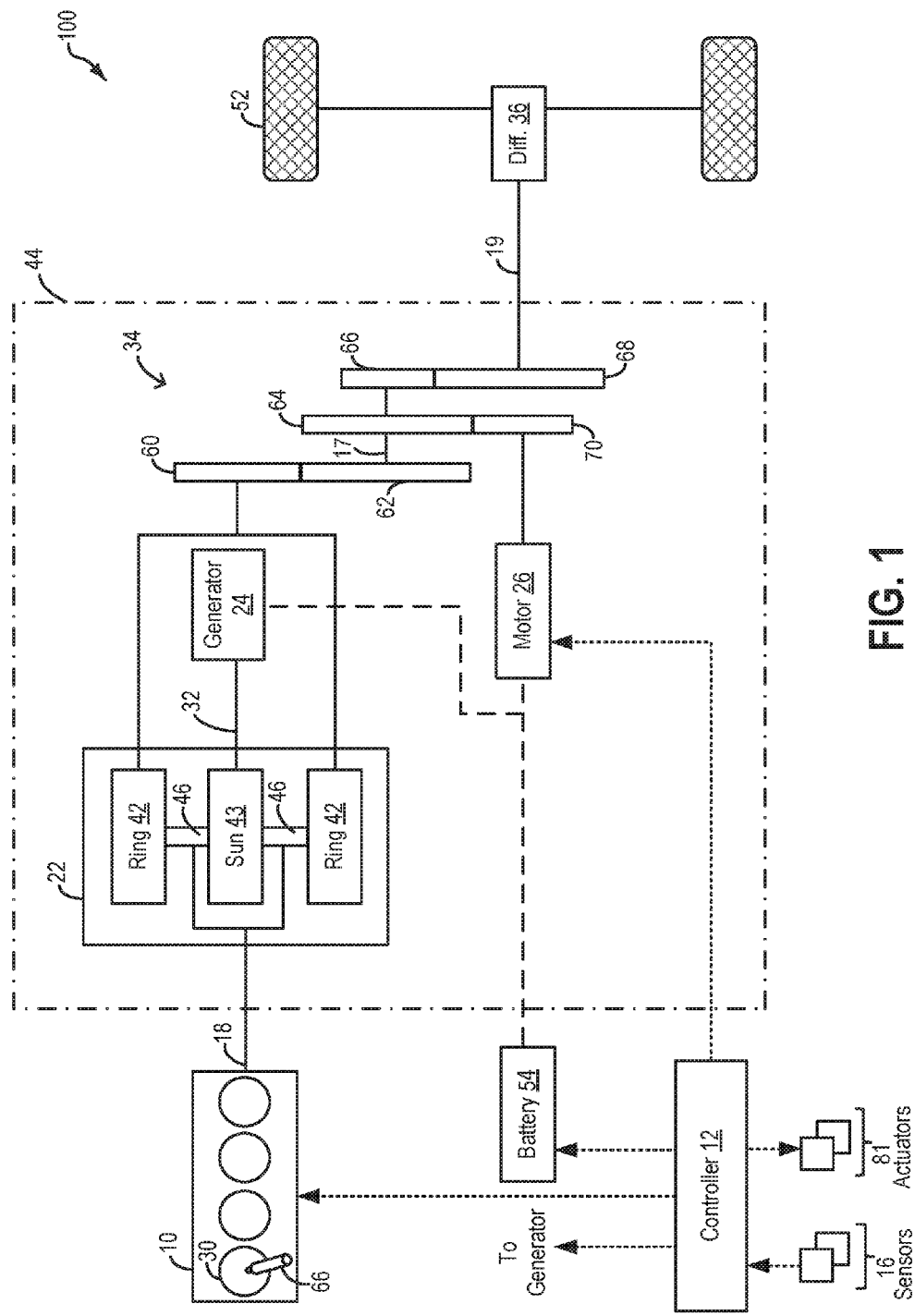
FIG. 1 illustrates an example propulsion system for a hybrid electric vehicle.

The following description relates to systems and methods for improving fuel economy in a hybrid vehicle system, such as the vehicle system of FIG. 1. The vehicle system may include an engine configured with a variable compression ratio (VCR) mechanism that enables a compression ratio of the engine to varied via mechanical adjustments, as described with reference to the engine system of FIG. 2. A controller may be configured to perform a control routine, such as the example routine of FIG. 3, to lower the compression ratio of the engine during engine pull-up and pull-down events to reduce associated pumping losses and NVH. The controller may also perform a routine responsive to a change in driver demand, such as the example routine of FIG. 4, to choose between transitioning to an alternate compression ratio and maintaining a current compression ratio while meeting the demand deficit using motor torque. Example maps that may be used by the controller to select a compression ratio are shown with reference to FIGS. 5-6. An example hybrid vehicle operation with compression ratio adjustments is shown at FIG. 7. In this way, VCT technology can be synergized with hybrid vehicle technology to achieve significant fuel economy improvements.

FIG. 1 depicts a hybrid propulsion system 100 for a vehicle. In the depicted embodiment, the vehicle is a hybrid electric vehicle (HEV), but alternate embodiments could include hybrid vehicles using hydraulic, pneumatic, flywheel, or other energy storage systems and motors. Propulsion system 100 includes an internal combustion engine 10 having a plurality of cylinders 30. Fuel may be provided to each cylinder of engine 10 from a fuel system (not shown) including one or more fuel tanks, one or more fuel pumps, and injectors 66. A detailed embodiment of the engine is provided with reference to FIG. 2.

Engine 10 delivers power to transmission 44 via torque input shaft 18. In the depicted example, transmission 44 is a power-split transmission (or transaxle) that includes a planetary gear set 22 and one or more rotating gear elements. Transmission 44 further includes an electric generator 24 and an electric motor 26. The electric generator 24 and the electric motor 26 may also be referred to as electric machines as each may operate as either a motor or a generator. Torque is output from transmission 44, for propelling vehicle tractions wheels 52, via a power transfer gearing 34, a torque output shaft 19, and differential-and-axle assembly 36.

Generator 24 is drivably connected to electric motor 26 such that each of electric generator 24 and electric motor 26 may be operated using electric energy from an electrical energy storage device, herein depicted as battery 54. In some embodiments, an energy conversion device, such as an inverter, may be coupled between the battery and the motor to convert the DC output of the battery into an AC output for use by the electric motor. However, in alternate embodiments, the inverter may be configured in the electric motor. Due to the mechanical properties of the planetary gear set, generator 24 may be driven by a power output element (on an output side) of the planetary gear set 22 via mechanical connection 32, as further elaborated below.

Electric motor 26 may be operated in a regenerative mode, that is, as a generator, to absorb energy from vehicle motion and/or the engine and convert the absorbed kinetic energy to an energy form suitable for storage in battery 54. Furthermore, electric motor 26 may be operated as a motor or generator, as required, to augment or absorb torque provided by the engine, such as during a transition of engine 10 between different combustion modes (e.g., during transitions between a spark ignition mode and a compression ignition mode). For example, during conditions when the engine torque output is higher than the driver demand, the torque difference may be absorbed at the motor and used to charge the battery, thereby smoothing out the torque transient.

Planetary gear set 22 comprises a ring gear 42, a sun gear 43, and a planetary carrier assembly 46. The ring gear and sun gear may be coupled to each other via the carrier. A first input side of planetary gear set 22 is coupled to engine 10 while a second input side of the planetary gear set 22 is coupled to the generator 24. An output side of the planetary gear set is coupled to vehicle traction wheels 52 via power transfer gearing 34 including one or more meshing gear elements 60-68. In one example, the meshing gear elements 60-68 may be step ratio gears wherein carrier assembly 46 may distribute torque to the step ratio gears. Gear elements 62, 64, and 66 are mounted on a countershaft 17 with gear element 64 engaging an electric motor-driven gear element 70. Electric motor 26 drives gear element 70, which acts as a torque input for the countershaft gearing. In this way, the planetary carrier 46 (and consequently the engine and generator) may be coupled to the vehicle wheels and the motor via one or more gear elements.

Hybrid propulsion system 100 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event. Accordingly, hybrid propulsion system 100 may be operated in various modes of operation.

For example, the vehicle may be driven in a first engine-on mode, herein also referred to as an "engine" mode, wherein engine 10 is operated in conjunction with the electric generator (which provides reaction torque to the planetary gear-set and allows a net planetary output torque for propulsion) and used as the primary source of torque for powering wheels 52 (the generator may also be providing torque to wheels if in motoring mode). During the "engine"

mode, fuel may be supplied to engine 10 from a fuel tank via fuel injector 66 so that the engine can spin fueled to provide the torque for propelling the vehicle. Specifically, engine power is delivered to the ring gear of the planetary gear set. Coincidentally, the generator provides torque to the sun gear 43, producing a reaction torque to the engine. Consequently, torque is output by the planetary carrier to gears 62, 64, 66 on countershaft 17, which in turn delivers the power to wheels 52. Optionally, the engine can be operated to output more torque than is needed for propulsion, in which case the additional power is absorbed by the generator (in generating mode) to charge the battery 54 or supply electrical power for other vehicle loads. In this mode, only engine torque is used to propel the vehicle wheels.

In another example, the vehicle may be driven in a second engine-on mode, herein also referred to as an "assist" mode. During the assist mode, engine 10 is operated and used as the primary source of torque for powering wheels 52 and the electric motor is used as an additional torque source to act in cooperation with, and supplement the torque provided by, engine 10. During the "assist" mode, as in the engine-only mode, fuel is supplied to engine 10 so as to spin the engine fueled and provide torque to the vehicle wheels. In this mode, each of engine torque and motor torque is used to propel the vehicle wheels.

In still another example, the vehicle may be driven in an engine-off mode, herein also referred to as an electric mode, wherein battery-powered electric motor 26 is operated and used as the only source of torque for driving wheels 52. As such, during the engine-off mode, no fuel may be injected into engine 10 irrespective of whether the engine is spinning or not. The "engine-off" mode may be employed, for example, when cruising at steady vehicle speed, during braking, light acceleration at low speeds, while stopped at traffic lights, etc. Specifically, motor power is delivered to gear element 70, which in turn drives the gear elements on countershaft 17, and thereon drives wheels 52. In this mode, only motor torque is used to propel the vehicle wheels.

Propulsion system 100 may further include a control system including controller 12 configured to receive information from a plurality of sensors 16 (various examples of which are described herein) and sending control signals to a plurality of actuators 81 (various examples of which are described herein). As one example, sensors 16 may include various pressure and temperature sensors, a fuel level sensor, various exhaust gas sensors, and other sensors such as those described with reference to FIG. 2. The various actuators may include, for example, the transmission gear set, cylinder fuel injectors, an air intake throttle coupled to the engine intake manifold, and other actuators such as those described with reference to FIG. 2. Controller 12 may receive input data from the various sensors, process the input data, and trigger the actuators in response to the processed input data based on instruction or code programmed therein corresponding to one or more routines. Example control routines are described herein with regard to FIGS. 3-4.

Figure 2:
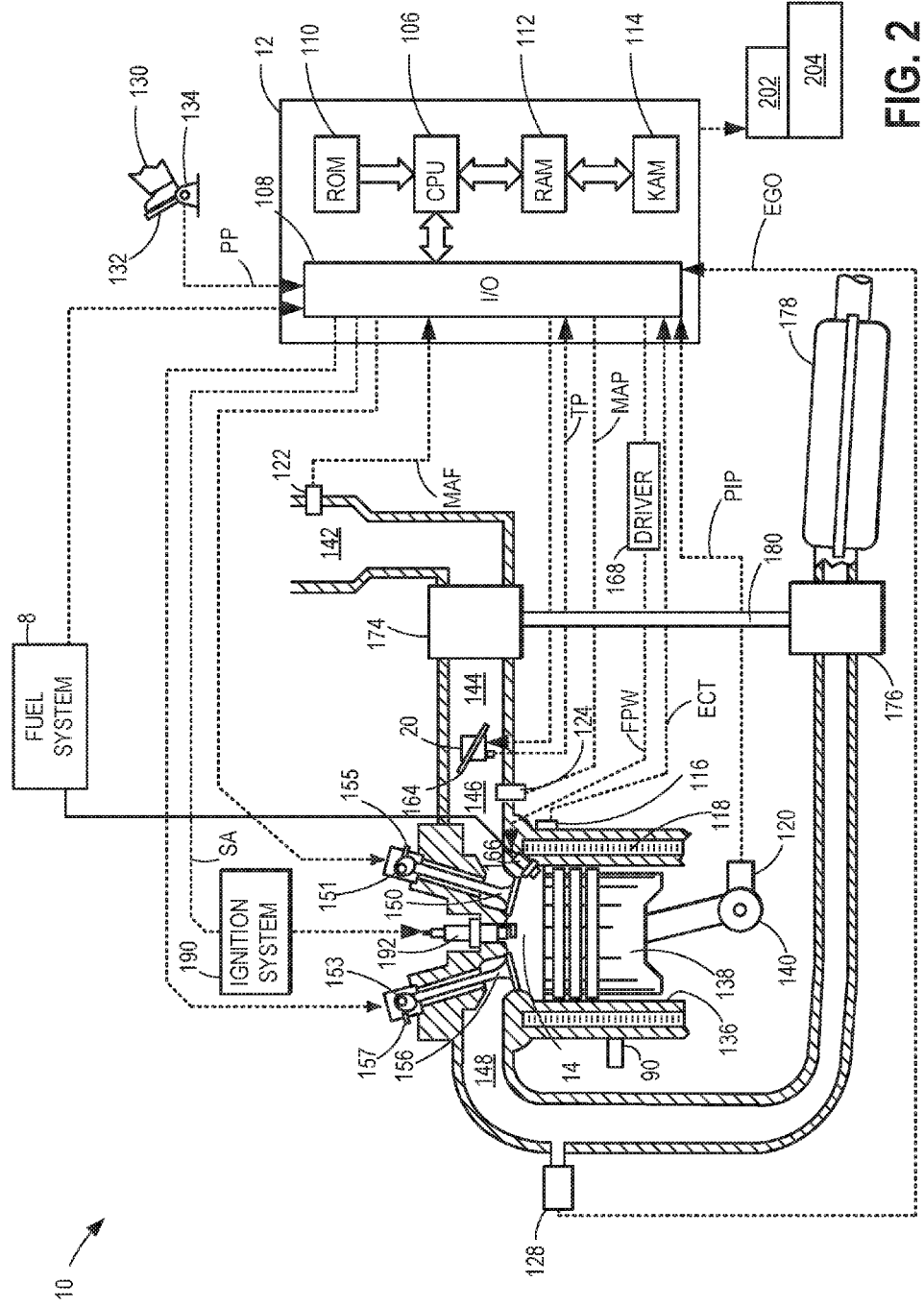
FIG. 2 shows a partial engine view.

FIG. 2 depicts an example embodiment of a combustion chamber or cylinder of internal combustion engine 10, such as engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Engine 10 may be configured as a variable compression ratio (VCR) engine wherein the compression ratio (CR) of each cylinder (that is, the ratio of the cylinder volume when the piston is at bottom-dead-center (BDC) to the cylinder volume when the piston is at top-dead-center (TDC)) can be mechanically altered. The CR of the engine may be varied via a VCR actuator 202 actuating a VCR mechanism 204. In some example embodiments, the CR may be varied between a first, lower CR (wherein the ratio of cylinder volume when the piston is at BDC to the cylinder volume when the piston is at TDC is smaller) and a second, higher CR (wherein the ratio is higher). In still other example, embodiments, there may be predefined number of stepped compression ratios. Further still, the CR may be continuously variable between the first, lower CR and the second, higher CR (to any CR in between).

In one example, VCR mechanism 204 is coupled to piston 138. Therein, the CR of the engine may be varied via a VCR mechanism that changes a piston TDC position. For example, piston 138 may be coupled to crankshaft 140 via a piston position changing VCR mechanism that moves the pistons closer to or further from the cylinder head, thus changing the size of combustion chamber 14. In one example, changing the position of the piston within the combustion chamber also changes the relative displacement of the piston within the cylinder. The piston position changing VCR mechanism may be coupled to a conventional cranktrain or an unconventional cranktrain. Non-limiting example of an unconventional cranktrain to which the VCR mechanism may be coupled include variable distance head crankshafts, variable height piston crowns, variable length connecting rods, and variable kinematic length crankshafts. In one example, crankshaft 140 may be configured as an eccentric shaft. In another example, an eccentric may be coupled to, or in the area of a piston pin, the eccentric changing the position of the piston within the combustion chamber. Movement of the eccentric may be controlled by oil passages in the piston rod.

It will be appreciated that still other VCR mechanisms that mechanically alter the compression ratio may be used. For example, the CR of the engine may be varied via a VCR mechanism that changes a cylinder head volume (that is, the clearance volume in the cylinder head). It will be appreciated that as used herein, the VCR engine may be configured to adjust the CR of the engine via mechanical adjustments that vary a piston position or a cylinder head volume. As such, VCR mechanisms do not include CR adjustments achieved via adjustments to a valve or cam timing.

By adjusting the position of the piston within the cylinder, an effective (static) compression ratio of the engine (that is a difference between cylinder volumes at TDC relative to BDC) can be varied. In one example, reducing the compression ratio includes reducing a displacement of the piston within the combustion chamber by increasing a distance between a top of the piston from a cylinder head. For example, the engine may be operated at a first, lower compression ratio by the controller sending a signal to actuate the VCR mechanism to a first position where the piston has a smaller effective displacement within the combustion chamber. As another example, the engine may be operated at a second, higher compression ratio by the controller sending a signal to actuate the VCR mechanism to a second position where the piston has a larger effective displacement within the combustion chamber. As elaborated herein, changes in the engine compression ratio may be advantageously used to reduce pumping losses and improve fuel economy in the hybrid vehicle system of FIG. 1. In addition, compression ratio adjustments may be used to reduce torque pulsations, address knock, and improve fuel efficiency.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor of the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector per cylinder, or two direct injectors/two port injectors per cylinder, etc.) and varying a relative amount of injection into the cylinder from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda (λ) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. Further, the abnormal combustion may be accordingly addressed. For example, knock may be addressed by reducing the compression ratio and/or retarding spark timing while pre-ignition is addressed by enriching the engine or limiting an engine load. In one example, knock may be addressed by reducing the compression ratio while maintaining spark timing until a threshold compression ratio is reached, and thereafter, further knock may be addressed by retarding spark timing while maintaining or increasing the compression ratio.

Returning to FIG. 2, controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. For example, adjusting the compression ratio of the engine may include adjusting a VCR actuator coupled to a VCR mechanism that mechanically alters a position of the piston to move the piston closer to or further from the cylinder head, to thereby change a volume of the combustion chamber.

Non-transitory storage medium read-only memory 110 can be programmed with computer readable data representing instructions executable by processor 106 for performing the methods described below as well as other variants that are anticipated but not specifically listed.

In this way the systems of FIGS. 1-2 provides for a hybrid vehicle system comprising an electric motor powered via a battery; an engine including a plurality of cylinders; a VCR mechanism for mechanically altering a piston position within a cylinder; vehicle wheels propelled via one or more of motor torque and engine torque; a pedal position sensor for receiving an operator torque demand; and a controller. The controller may be configured with computer-readable instructions stored on non-transitory memory for: in response to an increase in operator torque demand received while the vehicle wheels are propelled via motor torque, spinning up the engine, fueled, from rest, while holding the engine at a lower compression ratio until a threshold engine speed is reached, and then, transitioning the engine to a higher compression ratio; and in response to an increase in operator torque demand received while the vehicle wheels are propelled via engine torque, maintaining the engine at the higher compression ratio until a battery state of charge is lower than a threshold, and then transitioning to the lower compression ratio. The controller may include further instructions for operating the engine at the first compression ratio by actuating the VCR mechanism to a first position where the engine has a smaller compression ratio; and operating the engine at the second compression ratio by actuating the VCR mechanism to a second, different position where the engine has a larger compression ratio. The controller may additionally include further instructions for, in response to a decrease in operator torque demand received while the vehicle wheels are propelled via engine torque at the lower compression ratio, maintaining the engine at the lower compression ratio until the battery state of charge is lower than the threshold, and then transitioning to the higher compression ratio. The hybrid vehicle system may further comprise a knock sensor coupled to an engine block, and the controller may include further instructions for indicating engine knock based on an output of the knock sensor; and in response to the indication of knock, operating the engine with the lower compression ratio while maintaining spark timing at a peak torque timing. The controller may include further instructions for, responsive to a further indication of knock, retarding spark timing while maintaining the lower compression ratio.

It will be appreciated that while the examples disclosed herein are discussed with relation to a hybrid electric vehicle having an electrically actuated motor, this is not meant to be limiting, and the same approach may be applied to other hybrid vehicle systems such as those including a flywheel, hydraulic, and/or pneumatic motor. Likewise, any energy storage system may be used for providing motor torque, including but not limited to a system battery.

Figure 3:
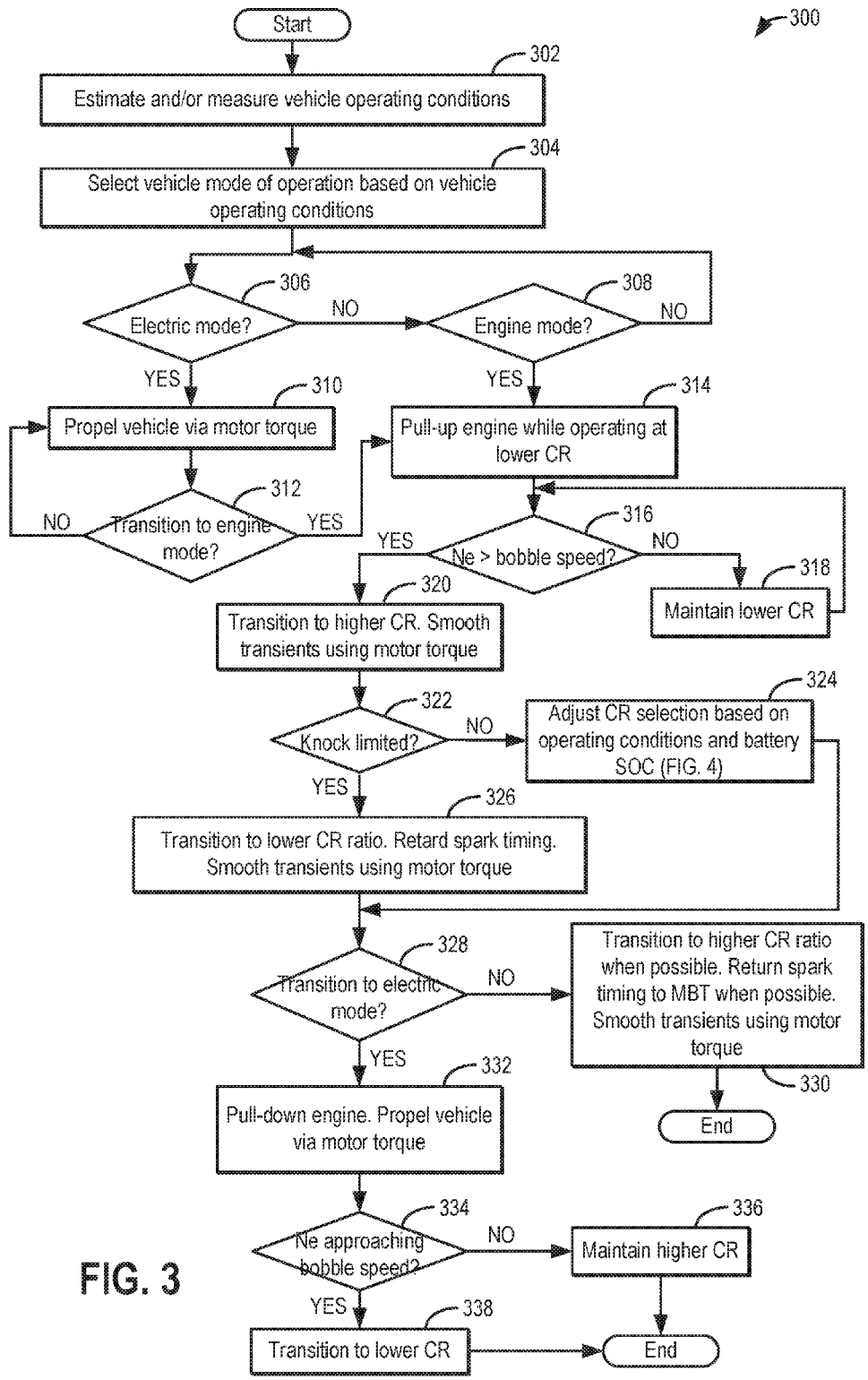
FIG. 3 shows a high level flow chart for mechanically adjusting an engine compression ratio during engine pull-up and pull-down events in a hybrid electric vehicle.

Now turning to FIG. 3, an example routine 300 is described for coordinating adjustments to a compression ratio of an engine configured with a piston adjusting mechanism with motor operation in a hybrid vehicle system. The method enables reduction in NVH and pumping losses during engine pull-up and pull-down events in the hybrid vehicle. In addition, motor torque adjustments can be leveraged to extend engine operation in a fuel efficient compression ratio despite changes in driver torque demand. Instructions for carrying out method 300 as well the other methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring vehicle operating conditions. These may include, for example, driver torque demand (such as based on output of a pedal position sensor coupled to an operator pedal), ambient temperature, pressure and humidity, engine temperature, battery state of charge, fuel level in a fuel tank, fuel octane of available fuel(s), etc. In addition, engine operating conditions such as manifold pressure (MAP), manifold air flow (MAF), engine temperature, catalyst temperature, intake temperature, knock limits, etc., may be estimated.

At 304, the method includes determining a vehicle mode of operation based on the estimated vehicle operating conditions. This includes shifting between propelling the vehicle motor torque and engine torque responsive to the engine operating conditions, including the driver demand. For example, an electric mode of operation may be selected when the torque demand is lower, when the fuel level in the fuel tank is lower, and/or when the battery state of charge is higher. In the electric mode, the vehicle wheels may be propelled only via motor torque from an electric motor that is powered by a system battery. As another example, an engine mode of operation may be selected when the torque demand is higher, when the fuel level in the fuel tank is higher, and/or when the battery state of charge is lower. In the engine mode, the vehicle wheels may be propelled only via engine torque from an engine. Further still, an assist mode may be selected if the torque is higher than a level that can be provided via only engine torque. Therein, the vehicle wheels may be propelled via each of motor torque and engine torque.

At 306, it may be confirmed if the electric mode was selected. If yes, then at 310, the method includes propelling the vehicle via motor torque. At 312, while operating in the electric mode, it may be determined if there is a change in operating conditions that warrants a transition to the engine mode. For example, a transition may be required if the battery state of charge drops below a threshold and the battery has to be recharged. If a transition to the engine mode is not required, the vehicle may continue to be propelled via motor torque. Else, the routine may move to 314, to restart the engine and operate in the engine mode, as described below.

If an electric mode is not confirmed, at 308, it may be confirmed if the engine mode was selected. If yes, then at 314, the method includes pulling up the engine. In other words, the engine is restarted from rest. This includes cranking the engine and delivering fuel to engine cylinders. In particular, during the engine pull-up/restart event, the engine may be cranked and operated while at a lower compression ratio at least until a threshold engine speed is crossed. Operating the engine at the lower compression ratio includes the controller sending a signal to a VCR actuator coupled to a VCR mechanism to mechanically alter a piston position to a first position where the effective displacement of the piston within the cylinder is smaller. For example, the compression ratio may be reduced via one of an elliptical crankshaft rotation and an eccentric coupled to a piston pin.

At 316, it may be determined if the engine speed is higher than a threshold speed. In the present example, the threshold speed is a bobble speed. This may be a speed in the low engine speed range wherein the compression-expansion cycles of the cylinder can excite the vehicle resulting in NVH issues. For example, the bobble may occur in the 300-500 rpm range. As such, the engine is maintained in the lower compression ratio at 318 until the bobble speed is crossed. The lower compression ratio lowers the negative IMEP in the compression-expansion loop, reducing torque pulsations that would have otherwise been experienced due to the compression-expansion cycles of the cylinder as the engine crosses the threshold speed. In addition, the engine can be restarted with lower friction, fewer heat transfer losses, and lower pumping losses. Furthermore, the lower compression ratio at the engine restart results in lower cylinder pressure, which decreases piston ring friction and piston side loads.

If the engine speed is above the bobble speed, at 320, the method includes transitioning the engine to the higher compression ratio. Operating the engine at the higher compression ratio includes the controller sending a signal to the VCR actuator coupled to the VCR mechanism to mechanically alter a piston position to a second position where the effective displacement of the piston within the cylinder is larger. For example, the compression ratio may be increased via one of an elliptical crankshaft rotation and an eccentric coupled to a piston pin.

It will be appreciated that while the present example suggests two distinct compression ratios for the engine (a first, lower and a second, higher compression ratio), in alternate examples, the VCR mechanism can be actuated to move the piston to any position between the first and second positions, enabling the engine to be operated in any compression ratio between, and including, the first and second compression ratios.

Also at 320, while transitioning from the first compression ratio to the second compression ratio, torque transients may be smoothed using motor torque. In this way, battery power is used to smooth out torque transients by filling in torque holes that are caused by changing the compression ratio. This leads to additional fuel economy improvements by reducing the need for spark retard which would otherwise have been required to smooth the torque transients.

At 322, while operating the vehicle with engine torque, it may be determined if the engine is knock limited (or is likely to become knock limited). In one example, an indication of knock may be determined if the output of the knock sensor (estimated in a knock window) is higher than a knock threshold. If the engine is knock limited, then at 326, in response to the indication of knock, the method includes reducing the compression ratio and operating the engine with the lower compression ratio. For example, the engine may be transitioned from the second, higher compression ratio to the first, lower compression ratio while maintaining the spark timing at a target timing, such as a peak torque timing (e.g., at MBT), or an alternate timing that corresponds to an optimal efficiency timing. If knock persists after the compression ratio has been reduced, then in response to the further indication of knock, spark timing may be retarded while maintaining the engine at the first, lower compression ratio. In an alternate example, in response to the original indication of knock, the controller may reduce the compression ratio while also retarding spark timing. As such, it will be appreciated that if the engine was already at the first compression ratio when the indication of knock was received, the controller may address the knock via spark retard only. By reducing the compression ratio to address knock, the amount of spark retard required may be decreased, improving fuel economy.

In an alternate example, in response to the indication of knock, the compression ratio may be reduced. Spark retard may be applied during the compression ratio transition for immediate knock addressal. Then, as soon as the compression ratio transition has been completed, spark timing may be returned to the original timing (e.g., to MBT). Herein, a smaller amount of spark retard is required to address the knock as the compression ratio transitions than would otherwise have been required if only spark retard were used to address the knock. In still further examples, in response to the indication of knock, an engine load may be reduced (e.g., immediately but by a smaller amount) while increasing motor torque so that motor torque (that is, battery power) is used to address the resulting torque transient and maintain driver demand.

It will be appreciated that in engine embodiments where the compression ratio can be varied to any compression ratio between the first and the second compression ratios, responsive to the indication of knock, the compression ratio may be reduced to the lower compression ratio while spark timing is maintained.

During the compression ratio transition (including the transition from the first compression ratio to the second compression ratio, as well as the transition from the second compression ratio to the first compression ratio), battery power or motor torque may be used to smooth out torque transients by filling in torque holes that are caused by the changing compression ratio. The motor torque may be drawn from an energy storage system not limited to a battery. In other example, the motor torque may include one or more of electric, hydraulic, flywheel, and pneumatic motor torque. This leads to additional fuel economy improvements by reducing the need for spark retard which would otherwise have been required to smooth the torque transients.

If the engine is not knock limited, then at 324, the method includes selecting a compression ratio for operating the engine, the selection based on engine operating conditions (such as based on the operator torque demand, or a change in the demand) and further based on the battery state of charge. For example, if the scheduled load (based on driver demand) is below the optimum efficiency load limit for a higher compression ratio (at which point engine operation in the higher compression ratio has a better fuel efficiency as compared to engine operation in the lower compression ratio), the engine may be transitioned to the higher compression ratio. As another example, if the driver demand requires high engine load and the scheduled load is above the optimum efficiency load limit for the higher compression ratio (at which point engine operation in the lower compression ratio has the better fuel efficiency), the engine may be transitioned to the lower compression ratio. As elaborated herein with reference to FIGS. 4-6, in response to a change in driver demand, the controller may select a compression ratio upon comparing the fuel economy benefits of transitioning the compression ratio (from an existing compression ratio to the other compression ratio which may be higher or lower) with maintaining the compression ratio while addressing any deficit in torque demand via power from the system battery (that is, via motor torque). The selecting may be based on the driver demand, as well as the battery state of charge. In addition, the selecting may be based on the original compression ratio of the engine when the change in driver demand is received. In this way, the vehicle may be operated with higher fuel economy and with a reduced frequency of compression ratio switching.

From each of 324 and 326, the method proceeds to 328 wherein it may be determined if there is a change in operating conditions requiring a transition to the electric mode. In one example, a transition to the electric mode may be desired if the driver torque demand is below a threshold and/or if the battery state of charge is sufficiently high to support the electric mode of operation. If a transition to the electric mode is not requested, then at 330, the method includes transitioning the engine to the higher compression ratio when possible (if the engine was in the lower compression ratio following the knock mitigation). In addition, if the spark timing was retarded for knock mitigation, spark timing may be returned to or towards MBT when possible. During the compression ratio transition, any torque transients may be smoothed out using motor torque (that is, using battery power).

If a transition to the electric mode is requested, then at 332, the method includes pulling down the engine. In other words, the engine is spun, unfueled, to rest. This includes discontinuing fuel delivery to engine cylinders while propelling the vehicle using motor torque drawn from the electric motor, which is driven using power from the system battery. In particular, during the engine pull-down, the engine may be maintained at the current compression ratio (e.g., the higher compression ratio) at least until the threshold engine speed is approached.

At 334, it may be determined if the engine speed has reduced to, or is approaching, the threshold speed (that is, the compression bobble speed). For example, it may be determined if the engine speed is approaching the 300-500 rpm range. If not, then at 336, the engine is continued to be spun down while maintaining the engine in the higher compression ratio. The engine is transitioned to the lower compression ratio at 338 when the bobble speed is reached so that the engine crosses the bobble region during the engine pull-down in the lower compression ratio. As elaborated earlier, the lower compression ratio in the lower engine speed range lowers the negative IMEP in the compression/expansion loop, reducing torque pulsations that would have otherwise been experienced due to the compression/expansion cycles of the cylinder as the engine crosses the bobble speed. In addition, piston ring friction and piston side loads are reduced.

In this way, the controller may shift between propelling the vehicle via motor torque and engine torque based on changes in driver demand, and during the shifting, when the engine speed is at or below the threshold speed, the engine may be transitioned to the lower compression ratio via mechanical adjustments. Thus the engine may be held in the lower compression ratio when passing through the bobble region during an engine pull-down event as well as an engine restart event.

Figure 5:
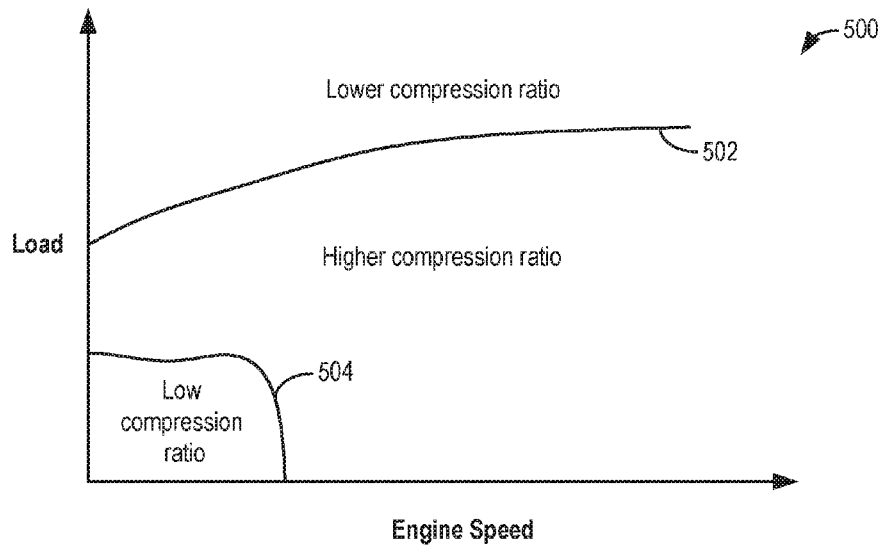
FIG. 5 shows an example map for compression ratio usage.

In one example, the controller may refer a map, such as example map 500 of FIG. 5 to select a compression ratio for operating the engine. As per the map, during conditions when the engine speed and load is low, such as when the engine is operating in region 504 of the map, the lower compression ratio may be selected. Operating region 504 may correspond to a region where a compression bobble may occur due to noise from compression/expansion cycles of the engine pistons at low speeds. In one example, operating region 504 corresponds to a speed range of 0-500 rpm. Operating conditions where the engine is operated in region 504 (in the lower compression ratio) may include engine restarts from rest (also referred to herein as engine pull-ups) and engine spindowns to rest (also referred to herein as engine pull-downs).

Once outside region 504, the controller may determine if the engine load corresponding to the driver demand is above or below optimum-efficiency load limit 502. In one example, limit 502 may be determined based on pre-determined dynamometer fuel economy mapping data for the various CR settings, where the data is input into tables in the control algorithm. If the engine load for the given driver demand is above optimum-efficiency load limit 502, it implies that the lower compression ratio can provide more fuel efficiency for the given driver demand. During such a condition, the controller may transition the engine to the lower compression ratio. If the engine load for the given driver demand is below optimum-efficiency load limit 502, it implies that the higher compression ratio can provide more fuel efficiency for the given driver demand. During such a condition, the controller may transition the engine to the higher compression ratio.

Figure 4:
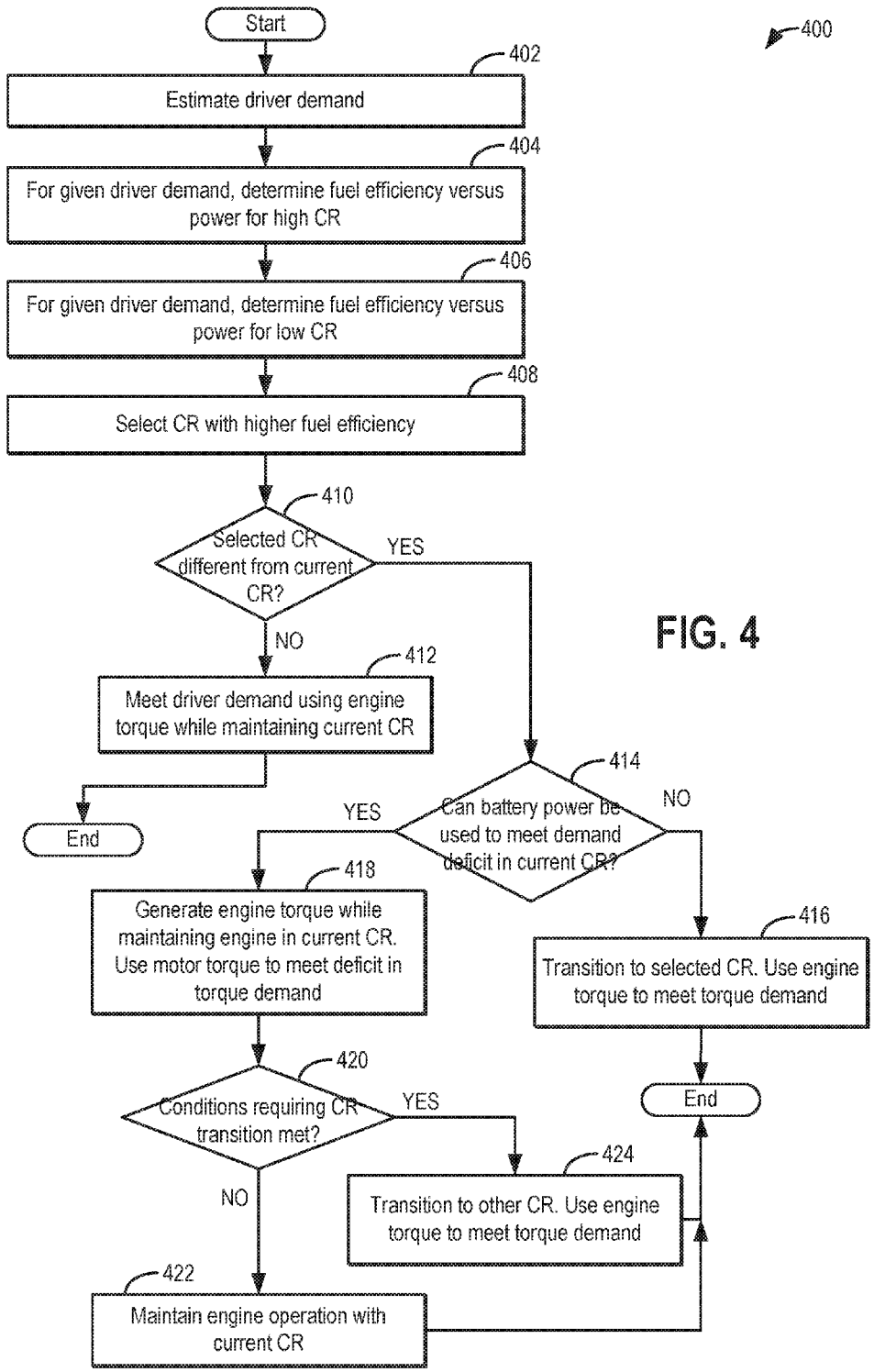
FIG. 4 shows a high level flow chart for coordinating engine compression ratio adjustments with the use of motor torque for improving fuel economy in a hybrid electric vehicle.

In this way, the use of VCR technology in a hybrid vehicle system is leveraged and optimized to improve fuel economy and NVH, and to reduce torque pulsations experienced during start/stop events, and to reduce the quantity of transitions between CR states for improved drivability and engine durability Now turning to FIG. 4, an example method 400 is shown for selecting a compression ratio for operating an engine, the selection based on operator demand and a state of charge of a system battery. The method enables the compression ratio of the engine to be maintained during selected conditions while battery power is used to fill a torque hole. As a result, frequent switching of compression ratios responsive to changes in driver demand are reduced, while operating the engine in a more fuel efficient manner.

At 402, the method includes estimating the driver demand. In one example, the driver torque demand may be inferred from an operator pedal position, such as an accelerator pedal position. At 404, the method includes, for the given driver demand, determining the fuel efficiency versus power (engine speed and load) for a higher compression ratio setting (such as for the second, higher compression ratio). At 406, for the same driver demand, the method includes determining the fuel efficiency versus power (engine speed and load) for a lower compression ratio setting (such as for the first, lower compression ratio).

At 408, the method includes selecting the compression ratio that has the higher fuel efficiency. As an example, for the given driver demand, it may be determined as to which compression ratio results in less absolute fuel usage (more fuel economy).

In one example, the controller may compare the brake specific fuel consumption (BSFC) of the engine at each compression ratio. As such, the BSFC may be defined as r/P where r is the fuel consumption rate in grams per second (g/s), and P is the power produced in watts, which is the engine speed in radians per second (rad/s) multiplied by the engine torque in newton meters (Nm). To get the BSFC, the controller may look-up a table of indicated torque for the given engine speed-load point. Next, the indicated torque may be multiplied by the torque ratio (TR) required by spark retard, the spark retard looked up in a border line spark table saved as a function of engine speed and load. Then, the controller may subtract off the inferred friction and pumping losses. The resulting brake torque is then multiplied by engine speed to determine engine power. The amount of fuel required to maintain the engine at stoichiometry for the air mass flow required to achieve the operating point is then divided by the determined power to the yield BSFC. The controller may then choose the compression ratio providing the lower BFSC as the more fuel efficient compression ratio.

Figure 6:
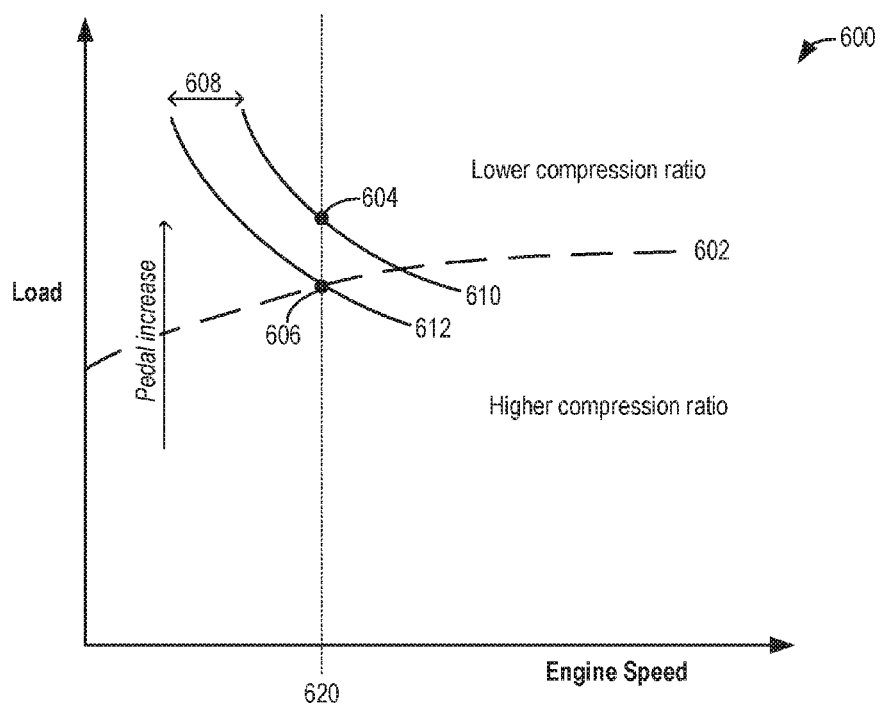
FIG. 6 shows an example map that may be used for deciding whether to switch an engine compression ratio during torque transitions.
Figure 7:
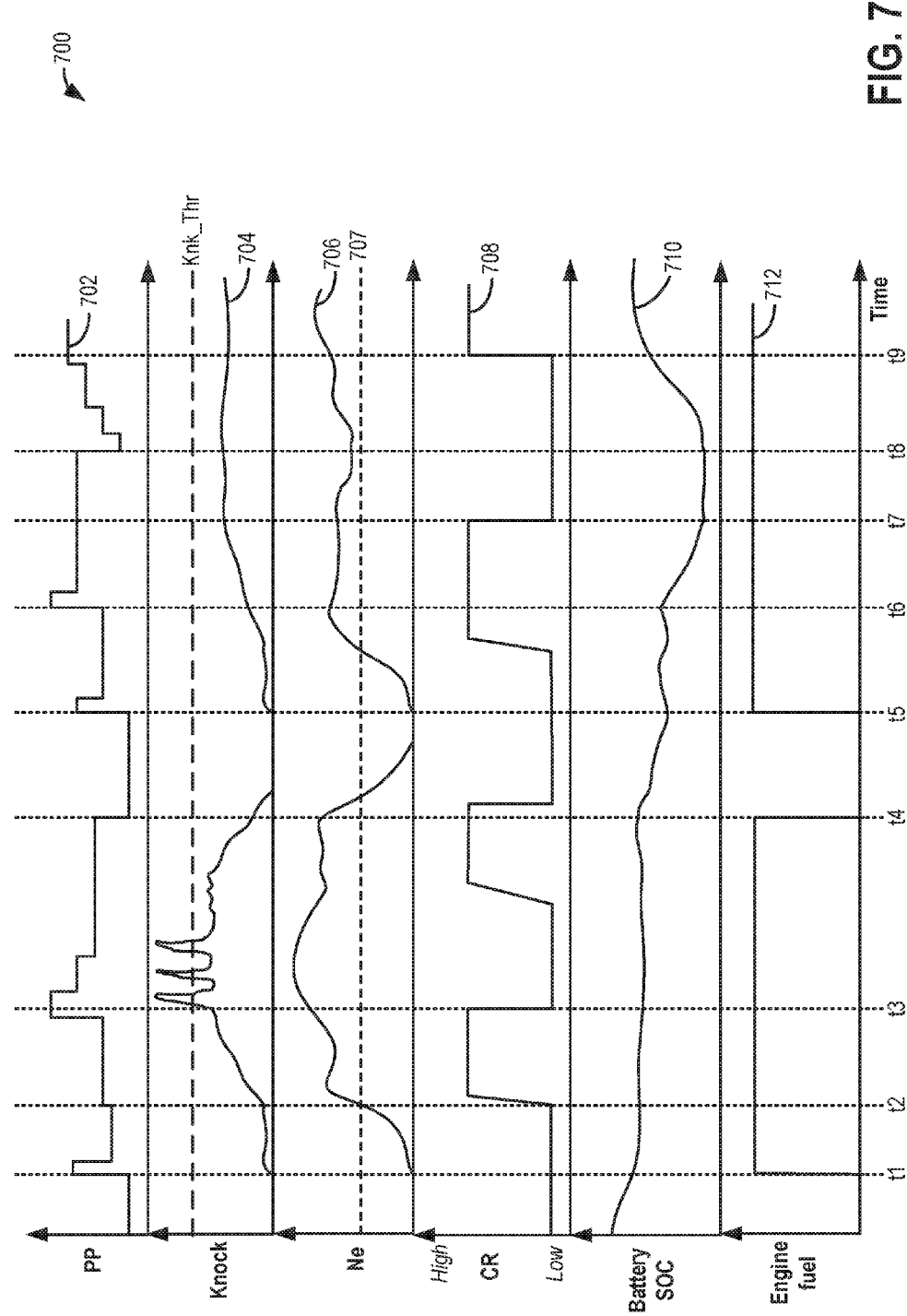
FIG. 7 shows example compression ratio adjustments during operation of a hybrid vehicle system.

In another example, the controller may reference a map, such as the maps of FIGS. 5-6 to identify the more fuel efficient compression ratio. With reference to FIGS. 5-6, if the driver demand corresponds to an engine load that is higher than optimum-efficiency load limit 502 (FIG. 5) or 602 (FIG. 6), it implies that the lower compression ratio is fuel efficient for the given demand. If the engine load for the given driver demand is below optimum-efficiency load limit 502 (FIG. 5) or 602 (FIG. 6), it implies that the higher compression is more fuel efficient for the given demand.

At 410, it may be determined if the selected compression ratio is different from the compression ratio the engine is currently operating in. For example, it may be determined if the selected compression ratio is the higher compression ratio while the current compression ratio is the lower compression ratio. Alternatively, it may be determined if the selected compression ratio is the lower compression ratio while the current compression ratio is the higher compression ratio. If the current compression ratio is the same as the selected compression ratio that is more fuel efficient for the given driver demand, then at 412, the method includes meeting the driver demand using engine torque while maintaining the current compression ratio.

If the selected compression ratio is different from the current compression ratio of the engine, then at 414, it may be determined if battery power can be used to meet a torque demand deficit while staying in the current compression ratio. This includes determining a torque deficit/excess resulting from maintaining the current compression ratio, and further determining a battery state of charge required to meet any torque deficit using motor torque. If sufficient battery power is not present (such as when the battery state of charge is below a threshold charge or when the torque deficit is too high), then at 418, the method includes transitioning to the selected compression ratio and using engine torque to meet the driver demand. The routine then exits.

If there is sufficient battery power, then at 416, the method includes using engine torque to propel the vehicle while maintaining the engine in the current compression ratio. Concurrently, motor torque (using battery power) is used to compensate for the torque transients resulting from the maintenance of the compression ratio.

As one example, in response to a decrease in the driver demand received while the engine in the lower compression ratio, the controller may maintain the lower compression ratio while reducing torque transients via the system battery when the battery state of charge is higher than a threshold. Herein the torque transient may be a torque excess that is absorbed by the motor and used to charge the battery. In comparison, the controller may transition the engine to the higher compression ratio when the battery state of charge is lower than the threshold. As another example, in response to an increase in the driver demand received while the engine in the higher compression ratio, the controller may maintain the higher compression ratio while reducing torque transients via the system battery when the battery state of charge is higher than a threshold. Herein the torque transient may be a torque deficit that is provided by the motor while discharging the battery. In comparison, the controller may transition the engine to the lower compression ratio when the battery state of charge is lower than the threshold. In this way, fuel economy, drivability, and engine durability is improved by reducing compression ratio switching while supplying a small amount of battery power (charge or discharge) to meet the driver demand.

At 420, it may be determined if conditions are present that require the compression ratio to be transitioned (e.g., transitioned back). This includes, as one example, a battery power threshold being exceeded (such as when the battery state of charge drops below a lower threshold where battery recharging is necessitated). As another example, a timer may be set when use of the motor torque (at 416) is initiated and the compression ratio transition conditions may be considered met if a time threshold (or threshold duration) is exceeded on the timer. As yet another example, compression ratio transition conditions may be considered met if the fuel efficiency of the current compression ratio for the current driver demand drops below the fuel efficiency of the other compression ratio for the current driver demand by more than a threshold amount. If any or all of these conditions are met, then at 424, the engine is transitioned out of the current compression ratio (which may be the lower or the higher compression ratio) to the other compression ratio (which is the higher or the lower compression ratio, respectively). Else, at 422, the current compression ratio is maintained.

An example of such an adjustment is shown with reference to FIG. 6. Map 600 depicts an engine speed-load map that may be referred to for selection of a fuel efficient compression ratio. Therein, based on a current driver demand, the engine may be at operating point 606 on the map. In particular, based on the engine load corresponding to a position on (or just below) optimum-efficiency load limit 602, the engine may be operating at position 606 with a higher compression ratio (that is, with VCR mechanism actuated to a position wherein the compression ratio is higher). In response to an increase in driver demand (such as due to an operator pedal tip-in while the engine is in the higher compression ratio), the engine may transition to operating point 604. As such, the vehicle may be operating at a given vehicle speed and a given transmission gear, with a torque convertor clutch locked. Consequently, the engine speed may remain fixed. Thus, in response to the increasing pedal input, the driver demand wheel power may move from operating point 606 to operating point 604 while staying at engine speed 620. As such, if the engine is used to deliver wheel power at operating point 604, the engine is moved above optimum-efficiency load limit 602, which would otherwise trigger the engine to transition to the lower compression ratio (that is, with the piston position adjusting mechanism actuated to a position wherein the piston displacement is lower). However, instead of switching compression ratios, fuel economy may be improved by maintaining the engine in the higher compression ratio by commanding the engine to operating point 606 while supplying additional torque via motor torque/battery power corresponding to a difference in driver demand, depicted herein at 608.

In an alternate example (not shown), based on current driver demand, the engine may be operating with an engine load corresponding to a position above optimum-efficiency load limit, and therefore at the lower compression ratio. In response to a decrease in driver demand (such as due to an operator pedal tip-out while the engine is in the lower compression ratio), the engine may transition to an operating point below the optimum-efficiency load limit. As such, the vehicle may be operating at a given vehicle speed and a given transmission gear, with a torque convertor clutch locked. Consequently, the engine speed may remain fixed. In response to the decreasing pedal input, the engine may move to an operating point below the optimum-efficiency load limit, which would otherwise trigger the engine to transition to the higher compression ratio.

However, instead of switching compression ratios, fuel economy may be improved by maintaining the engine in the lower compression ratio while absorbing torque at the motor (that is, generating battery charging power) corresponding to a difference in driver demand.

In this way, a hybrid electric vehicle may be propelled via an engine at a first compression ratio selected based on driver demand, and in response to a change in the driver demand, an engine controller may select between maintaining the first compression ratio and transitioning to a second, different (higher or lower) compression ratio based on each of the change in the driver demand and a battery state of charge. The selecting may be further based on engine speed, a lower of the first and second compression ratios selected when the engine speed is below a threshold speed during an engine spin-down to rest and an engine spin-up from rest.

Turning now to FIG. 7, example engine compression ratio adjustments during operation of a hybrid electric vehicle are shown at map 700. Map 700 depicts changes to an operator pedal position (PP) at plot 702, knock sensor output at plot 704, engine speed at plot 706, compression ratio changes at plot 708, a battery state of charge (SOC) at plot 710, and engine fueling (on or off) at plot 712. All plots are shown over time (along the x-axis). Significant timepoints during vehicle operation are shown at t1-t9.

Prior to t1, the hybrid vehicle is operating in an electric mode with vehicle wheels being propelled using motor torque. In one example, vehicle operation in the electric mode is in response to a lower driver demand (plot 702). Due to the vehicle being propelled using motor torque, engine fueling is disabled (plot 712) and the battery SOC may be gradually decreasing (as battery power is drawn to provide the motor torque).

At t1, in response to an increase in driver demand (such as due to a tip-in), the vehicle may be shifted to the engine mode so that engine torque can be used to propel the vehicle and meet the driver demand. Due to the vehicle being propelled using engine torque, engine fueling is enabled and the battery SOC may hold steady. In particular, at t1, the engine is restarted or pulled-up. To reduce pumping losses during the restart, the engine may be restarted in the lower compression ratio via mechanical adjustments (plot 708). Between t1 and t2, as the engine spins up fueled and moves through a bobble speed region, the lower compression ratio is maintained. At t2, once bobble speed 707 is crossed, the engine may be transitioned to the higher compression ratio via mechanical adjustments to improve fuel efficiency.

Between t2 and t3, based on driver demand, the engine load may be in a region where the higher compression ratio is more fuel efficient (e.g., the engine load is above an optimum efficiency load limit, not shown). Accordingly, the higher compression ratio is maintained.

Just prior to t3, driver demand may further increase and accordingly the engine may move into a higher engine speed-load region. At t3, in response to the further increase in driver demand, engine knocking may occur, as indicated by the knock sensor signal (estimated in a knock window) exceeding a knock threshold (knk_Thr). In response to the indication of knock, the engine compression ratio may be immediately moved to the lower compression ratio to reduce further knock incidence. The lower compression is then held for a duration until the knock indication subsides (e.g., until engine knock signal remains below the knock threshold for a duration), after which the higher compression ratio may be resumed since the engine continues to be operated in a region where the higher compression ratio is more fuel efficient.

At t4, in response to a drop in driver demand (such as due to an operator pedal tip-out event), the engine may be shutdown (or pulled down) and the vehicle may be propelled using motor torque. Accordingly, engine fueling is disabled and the engine may start spinning to rest unfueled. In addition, the battery SOC may start to drop between t4 and t5 as motor torque is used to propel the vehicle. To reduce pumping losses during the pull-down, the engine may be transitioned to the lower compression ratio just before the engine speed reaches bobble speed 707. Between t4 and t5, as the engine spins down unfueled and moves through the bobble speed region, the lower compression ratio is maintained.

At t5, as at t1, in response to a rise in driver demand, the engine may be restarted, engine fueling may be resumed, and the vehicle may be propelled with motor torque. As during the preceding restart, the engine may be held in the lower compression ratio until bobble speed 707 is exceeded, after which the engine is transitioned to the more fuel efficient (for the given driver demand) higher compression ratio.

At t6, while operating the engine in the higher compression ratio, there may be an increase in operator driver demand due to an operator pedal tip-in. In particular, the increase in driver demand may push the engine load (not shown) above an optimum efficiency load limit. As such, this would have triggered the engine to shift to the lower compression ratio. However in the present example, a higher fuel efficiency is achieved by maintaining the engine in the higher compression ratio in response to the increase in driver demand while meeting the transient torque deficit (resulting from the maintaining in the higher compression ratio) using motor torque, as indicated by the resulting decrease in battery SOC (that is, the battery discharges power). The engine is held in the higher compression ratio while motor torque is used to smooth the transients between t6 and t7. At t7, the battery SOC may reach a lower threshold and it may not be possible to use battery power to meet the torque deficit. Accordingly at t7, the engine is moved to the lower compression ratio.

At t8, while operating the engine in the lower compression ratio, there may be a decrease in operator driver demand due to an operator pedal tip-out. In particular, the decrease in driver demand may push the engine load (not shown) below an optimum efficiency load limit. As such, this would have triggered the engine to shift to the higher compression ratio. However in the present example, a higher fuel efficiency is achieved by maintaining the engine in the lower compression ratio in response to the decrease in driver demand while smoothing the transient torque difference (herein excess torque resulting from the maintaining in the lower compression ratio) using motor torque, as indicated by the resulting increase in battery SOC (that is, the battery charges power). The engine is held in the lower compression ratio while the battery is between t8 and t9. At t9, it may be determined that a threshold time has elapsed since the maintaining of the compression ratio responsive to driver demand decrease (at t8). Accordingly at t9, the engine is returned to the higher compression ratio.

After t9, the engine may be held in the higher compression ratio due to the driver demand corresponding to an engine load that is below the optimum efficiency load limit wherein the higher compression ratio is the more fuel efficient option.

In this way, fuel economy losses in a hybrid vehicle system due to frequent engine pull-ups and pull-downs (such as on a city cycle) can be reduced. By using mechanical adjustments to a piston position within a cylinder to selectively lower the compression ratio during the engine pull-ups and pull-downs, friction, pumping losses and associated NVH issues are reduced. In addition, torque pulsations experienced in the low speed region due to compression-expansion cycles are reduced. By using motor torque to provide a driver demand while maintaining a compression ratio, frequent switching between compression ratio settings is reduced, even as an operator pedal position changes frequently or oscillates or overshoots. Consequently, even if engine load moves back and forth excessively between the optimum region of different compression ratios, fuel economy can be improved by staying in a more efficient VCR settings while applying a small amount of battery power charge or discharge to meet the driver demand. Overall, synergistic fuel economy benefits are achieved by integrating the VCR technology into the hybrid vehicle system.

One example method for a hybrid vehicle comprises: shifting between propelling the vehicle via motor torque and engine torque responsive to driver demand; and during the shifting, when engine speed is at or below a threshold speed, transitioning the engine to a lower compression ratio. In the preceding example method, additionally or optionally, the shifting includes responsive to a decrease in driver demand, shifting from propelling the vehicle via engine torque (from an internal combustion engine) to propelling via motor torque during an engine pull-down event, and responsive to an increase in driver demand, shifting from propelling the vehicle via motor torque to propelling the vehicle via engine torque during an engine restart event, the motor torque including one or more of electric, hydraulic, pneumatic, and flywheel motor torque drawn from an energy storage system. In any or all of the preceding examples, additionally or optionally, the threshold speed corresponds to an engine speed where torque pulsations from engine compression-expansion cycles cause a higher than threshold NVH (that is, where a compression bobble is formed). In any or all of the preceding examples, additionally or optionally, the method further comprises, during the shifting, reducing torque transients using motor torque from the energy storage system. In one example embodiment, the energy storage system includes a system battery. In any or all of the preceding examples, additionally or optionally the method further comprises, when propelling the vehicle via engine torque, transitioning the engine to a higher compression ratio after the engine speed is above the threshold speed. In any or all of the preceding examples, additionally or optionally, transitioning to the lower compression ratio includes actuating a variable compression ratio (VCR) mechanism to a first position, and wherein transitioning to the higher compression ratio includes actuating the VCR mechanism to a second position, the variable compression ratio mechanism including one of a piston position changing mechanism and a cylinder head volume changing mechanism, the piston position changing mechanism including one of an elliptical crankshaft rotation, an eccentric coupled to a piston pin, a variable height piston crown, a variable length connecting rod, and an unconventional cranktrain linkage. In any or all of the preceding examples, additionally or optionally, the method further comprises, in response to an indication of knock, operating with the lower compression ratio while maintaining spark timing at a peak torque timing, and responsive to a further indication of knock, retarding spark timing while maintaining the lower compression ratio, or reducing the engine load/torque while increasing the motor torque. In any or all of the preceding examples, additionally or optionally, the method further comprises, while in the lower compression ratio, in response to a decrease in the driver demand, maintaining the lower compression ratio while reducing torque transients via the energy storage system (such as the battery) when a state of charge of the energy storage system is higher than a threshold; and transitioning to the higher compression ratio when the state of charge is lower than the threshold. In any or all of the preceding examples, additionally or optionally, the method further comprises while in the higher compression ratio, in response to an increase in the driver demand, maintaining the higher compression ratio while reducing torque transients via the energy storage system (such as the system battery) when the state of charge is higher than the threshold; and transitioning to the lower compression ratio when the state of charge is lower than the threshold.

Another example method for a hybrid vehicle comprises: propelling the vehicle via an engine at a first compression ratio selected based on driver demand; and in response to a change in driver demand, selecting between maintaining the first compression ratio and transitioning to a second, different compression ratio based on each of the change in driver demand and a battery state of charge. In the preceding example method, additionally or optionally, the method further comprises when maintaining the first compression ratio, compensating for a deficit in the driver demand via motor torque from an electric motor coupled to the battery. In any or all of the preceding examples, additionally or optionally, the first compression ratio is lower than the second compression ratio, the change in driver demand is a drop in driver demand, and wherein the selecting includes transitioning to the second compression ratio when the battery state of charge is lower than a threshold, and maintaining the first compression ratio when the battery state of charge is higher than the threshold. In any or all of the preceding examples, additionally or optionally, the selecting is further based on engine speed, a lower of the first and second compression ratio selected when the engine speed is below a threshold speed during an engine spin-down to rest and an engine spin-up from rest, and wherein the threshold speed is a bobble speed where the engine undergoes resonance related to a compression-expansion cycle of the engine. In any or all of the preceding examples, additionally or optionally, the first compression ratio is higher than the second compression ratio, the change in driver demand is a rise in driver demand, and wherein the selecting includes transitioning to the second compression ratio when the battery state of charge is lower than a threshold, and maintaining the first compression ratio when the battery state of charge is higher than the threshold. In any or all of the preceding examples, additionally or optionally, the method further comprises, in response to an indication of knock, transitioning the engine to the lower compression ratio. In any or all of the preceding examples, additionally or optionally, in the lower of the first and second compression ratio, a piston in each engine cylinder is at a (first) position where a volume between the piston and a cylinder head is higher, and wherein in the higher of the first and second compression ratio, the piston is at a (second) position where the volume between the piston and the cylinder head is smaller, and wherein the transitioning includes actuating a piston position changing mechanism.

Another example hybrid vehicle system comprises: an electric motor powered via a battery; an engine including a cylinder; a piston variable compression ratio mechanism for varying a compression ratio of the engine via mechanical alteration of a piston position within the cylinder; vehicle wheels propelled via one or more of motor torque and engine torque; a pedal position sensor for receiving an operator torque demand; and a controller. The controller may be configured with computer-readable instructions stored on non-transitory memory for: in response to an increase in operator torque demand received while the vehicle wheels are propelled via motor torque, spinning up the engine, fueled, from rest, while holding the engine at a lower compression ratio until a threshold engine speed is reached, and then, transitioning the engine to a higher compression ratio; and in response to an increase in operator torque demand received while the vehicle wheels are propelled via engine torque, maintaining the engine at the higher compression ratio until a battery state of charge is lower than a threshold, and then transitioning to the lower compression ratio. In the preceding example system, additionally or optionally, the controller includes further instructions for: operating the engine at the first compression ratio by actuating the VCR mechanism to a first position where the piston has a smaller effective displacement; and operating the engine at the second compression ratio by actuating the VCR mechanism to a second, different position where the piston has a larger effective displacement. In any or all of the preceding examples, additionally or optionally, the controller includes further instructions for: in response to a decrease in operator torque demand received while the vehicle wheels are propelled via engine torque at the lower compression ratio, maintaining the engine at the lower compression ratio until the battery state of charge is lower than the threshold, and then transitioning to the higher compression ratio. In any or all of the preceding examples, additionally or optionally, the system further comprises a knock sensor coupled to an engine block, wherein the controller includes further instructions for: indicating engine knock based on an output of the knock sensor; and in response to the indication of knock, operating the engine with the lower compression ratio while maintaining spark timing at a target timing (such as peak torque timing), the target timing corresponding to an optimal efficiency timing. In any or all of the preceding examples, additionally or optionally, the controller includes further instructions for, responsive to a further indication of knock, retarding spark timing while maintaining the lower compression ratio.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a hybrid vehicle, comprising:
shifting between propelling the vehicle via only motor torque and propelling the vehicle via only engine torque or via engine torque and motor torque responsive to driver demand; and
during the shifting, and responsive to engine speed at or below a threshold speed, transitioning an engine to a lower compression ratio.

2. The method of claim 1, wherein the shifting includes, responsive to a decrease in driver demand, shifting from propelling the vehicle via engine torque to propelling via only motor torque during an engine pull-down event, and responsive to an increase in driver demand, shifting from propelling the vehicle via motor torque to propelling the vehicle via only engine torque or via engine torque and motor torque during an engine restart event, the motor torque including one or more of electric, hydraulic, pneumatic, and flywheel motor torque drawn from an energy storage system.

3. The method of claim 1, wherein the threshold speed corresponds to an engine speed where torque pulsations from engine compression-expansion cycles cause a higher than threshold NVH.

4. The method of claim 2, further comprising, when propelling the vehicle with engine torque, transitioning the engine to a higher compression ratio when the engine speed is above the threshold speed and a load of the engine is less than a threshold load, and transitioning back to the lower compression ratio when the load of the engine increases above the threshold load.

5. The method of claim 4, wherein transitioning to the lower compression ratio includes actuating a variable compression ratio mechanism to a first position, and wherein transitioning to the higher compression ratio includes actuating the variable compression ratio mechanism to a second position, the variable compression ratio mechanism including one of a piston position changing mechanism and a cylinder head volume changing mechanism, the piston position changing mechanism including one of an elliptical crankshaft, an eccentric coupled to a piston pin, a variable height piston crown, a variable length connecting rod, and an unconventional cranktrain linkage.

6. The method of claim 2, further comprising, during the shifting, reducing torque transients using motor torque from the energy storage system.

7. The method of claim 4, further comprising, while in the lower compression ratio, in response to a decrease in the driver demand:
maintaining the lower compression ratio while reducing torque transients via the energy storage system when a state of charge is higher than a threshold; and
transitioning to the higher compression ratio when the state of charge is lower than the threshold.

8. The method of claim 7, further comprising, while in the higher compression ratio, in response to an increase in the driver demand:
maintaining the higher compression ratio while reducing torque transients via a system battery when the state of charge is higher than the threshold; and
transitioning to the lower compression ratio when the state of charge is lower than the threshold.

9. A method for a hybrid electric vehicle, comprising:
propelling the vehicle via an engine at a first compression ratio selected based on driver demand; and
in response to a change in driver demand, selecting between maintaining the first compression ratio and transitioning to a second, different compression ratio based on each of the change in driver demand and a battery state of charge, wherein the selecting is further based on engine speed, and wherein a lower of the first and second compression ratios is selected when the engine speed is below a threshold speed during an engine spin-down to rest and an engine spin-up from rest.

10. The method of claim 9, further comprising, when maintaining the first compression ratio, compensating for a deficit in the driver demand via motor torque from an electric motor coupled to a battery.

11. The method of claim 9, wherein the first compression ratio is lower than the second compression ratio, the change in driver demand is a drop in driver demand, and wherein the selecting includes transitioning to the second compression ratio when the battery state of charge is lower than a threshold, and maintaining the first compression ratio when the battery state of charge is higher than the threshold.

12. The method of claim 9, wherein the threshold speed is a bobble speed where the vehicle undergoes resonance related to a compression-expansion cycle of the engine.

13. The method of claim 9, wherein the first compression ratio is higher than the second compression ratio, the change in driver demand is a rise in driver demand, and wherein the selecting includes transitioning to the second compression ratio when the battery state of charge is lower than a threshold, and maintaining the first compression ratio when the battery state of charge is higher than the threshold.

14. The method of claim 9, further comprising, in response to an indication of knock, transitioning the engine to the lower of the first and second compression ratios.

15. The method of claim 9, wherein in the lower of the first and second compression ratios, a piston in each engine cylinder is at a position where a volume between the piston and a cylinder head is higher, and wherein in a higher of the first and second compression ratios, the piston is at a position where the volume between the piston and the cylinder head is smaller, and wherein the transitioning includes actuating a piston position changing mechanism.

16. A hybrid vehicle system, comprising:
 a motor powered via an energy storage system;
 an internal combustion engine including a cylinder;
 a variable compression ratio (VCR) mechanism for varying a compression ratio of the engine via mechanical alteration of a piston position within the cylinder;
 vehicle wheels propelled via one or more of motor torque and engine torque;
 a pedal position sensor for receiving an operator torque demand; and
 a controller with computer-readable instructions stored on non-transitory memory for:
  in response to an increase in operator torque demand received while the vehicle wheels are propelled via motor torque,
  spinning up the engine from rest, while holding the engine at a lower compression ratio until a threshold engine speed is reached, and then, transitioning the engine to a higher compression ratio; and
  in response to an increase in operator torque demand received while the vehicle wheels are propelled via engine torque,
   maintaining the engine at the higher compression ratio until an energy storage system state of charge is lower than a threshold, and then transitioning to the lower compression ratio.

17. The system of claim 16, wherein the controller includes further instructions for:
 operating the engine at the higher compression ratio by actuating the VCR mechanism to a position where the cylinder has a smaller clearance volume; and
 operating the engine at the lower compression ratio by actuating the VCR mechanism to a second, different position where the cylinder has a larger clearance volume.

18. The system of claim 16, wherein the controller includes further instructions for:
 in response to a decrease in operator torque demand received while the vehicle wheels are propelled via engine torque at the lower compression ratio, maintaining the engine at the lower compression ratio until the energy storage system state of charge is lower than the threshold, and then transitioning to the higher compression ratio.

19. The system of claim 16, further comprising a knock sensor coupled to an engine block, wherein the controller includes further instructions for:
 indicating engine knock based on an output of the knock sensor; and
 in response to the indication of knock, operating the engine with the lower compression ratio while maintaining spark timing at a target timing.

20. The system of claim 19, wherein the controller includes further instructions for:
 responsive to a further indication of knock, retarding spark timing while maintaining the lower compression ratio.

* * * * *